US012280342B2

(12) United States Patent
Tachanov et al.

(10) Patent No.: US 12,280,342 B2
(45) Date of Patent: Apr. 22, 2025

(54) APPARATUS FOR INJECTION OF A POWDER REAGENT INTO THE FLOW OF A PETROLEUM PRODUCT AND PLANT FOR TRANSPORTATION OF PETROLEUM PRODUCTS

(71) Applicant: IRIS TECH, INC., Houston, TX (US)

(72) Inventors: Aleksandr Grigorievich Tachanov, Kazan (RU); Artur Talgatovich Fakhraziev, Kazan (RU); Aleksandr Aleksandrovich Nikitin, Kazan (RU); Igor Aleksandrovich Malykhin, Moscow (RU)

(73) Assignee: IRIS TECH, INC., Houston, TX (US)

(*) Notice: Subject to any disclaimer, the term of this patent is extended or adjusted under 35 U.S.C. 154(b) by 673 days.

(21) Appl. No.: 17/568,074

(22) Filed: Jan. 4, 2022

(65) Prior Publication Data

US 2023/0211298 A1 Jul. 6, 2023

(51) Int. Cl.

*B01F 23/50* (2022.01)
*B01F 35/32* (2022.01)
*B01F 35/71* (2022.01)

(52) U.S. Cl.

CPC ............ *B01F 23/59* (2022.01); *B01F 35/321* (2022.01); *B01F 35/7176* (2022.01); *B01F 35/71775* (2022.01); *B01F 35/71805* (2022.01)

(58) Field of Classification Search

CPC .............. B01F 15/0294; B01F 15/0202; B01F 15/0238; B01F 5/043; B01F 15/026; B01F 15/0251; B01F 15/00155; B01F 15/00422; B01F 15/06; B01F 15/0283; B01F 15/00311; B01F 3/12; B01F 2015/062; B01F 2215/0081; B01F 2005/0017; B01F 23/59; B01F 35/7176; B01F 35/71775; B01F 35/71805; B01F 23/57;

(Continued)

(56) References Cited

U.S. PATENT DOCUMENTS 2,653,801 A * 9/1953 Arthur .................. B01F 25/102 366/156.1
4,275,033 A * 6/1981 Schulte .................. B29B 7/748 366/182.1

(Continued)

FOREIGN PATENT DOCUMENTS

CN 102121705 B 7/2012

*Primary Examiner* — Charles Cooley
(74) *Attorney, Agent, or Firm* — Nadya Reingand

(57) ABSTRACT

A device for mixing a powder reagent with a flow of a liquid medium allows reducing the liquid drag by an apparatus for injection of a powder reagent into the flow of a petroleum product, which comprises: a mixing chamber, an inlet for feeding a powder reagent, an outlet to remove the powder reagent mixed with the petroleum product; a powder reagent introducer having a screw with an outlet connected to the inlet of the mixing chamber through a flow restriction device; a pump for feeding the mixture from the mixing chamber to the oil pipeline, in which the specified at least one inlet for feeding petroleum products are tangential, an inlet for feeding the reagent and the outlet to remove the mixture are axial. Based upon a load of the screw, a gear motor controls the opening and closing of the flow restriction device via a coupling system to control the transporting of the powder reagent to the mixing chamber.

6 Claims, 5 Drawing Sheets

(58) Field of Classification Search
CPC .. B01F 25/103; B01F 25/32; B01F 25/43151; B01F 25/43162; B01F 27/1143; B01F 27/50; B01F 33/8212; B01F 35/561; B01F 23/53; B65G 33/22; E21B 43/2607; C09K 8/68
USPC ........... 366/64, 66, 178.1–178.3, 323, 167.1, 366/182.4, 152.6, 163.2, 184–196, 366/165.1–165.5, 156.1–158.4, 182.3; 222/285, 290; 406/60; 414/218
See application file for complete search history.

(56) References Cited

U.S. PATENT DOCUMENTS 4,426,156 A * 1/1984 Adamo ................. B01F 33/821 366/156.1
4,688,945 A * 8/1987 Brazelton ............. B01F 25/103 366/156.1
5,174,651 A * 12/1992 Gaddis .................... B01F 21/30 366/156.1
5,222,807 A * 6/1993 Gaddis .................... B01F 21/00 366/156.1
5,344,619 A * 9/1994 Larwick ............ B01F 35/71775 422/135
5,547,276 A * 8/1996 Sulzbach .............. B29B 7/7485 366/139
5,660,466 A * 8/1997 Hopson ................. B01F 25/721 239/113
5,857,773 A * 1/1999 Tammelin ........... B01F 25/3121 366/163.2
5,899,561 A * 5/1999 Gian ..................... B01F 33/404 366/141
5,951,161 A * 9/1999 Blagg ................. B01F 35/8311 366/152.6
6,039,470 A * 3/2000 Conwell ................. B01F 25/50 366/137
6,979,116 B2 * 12/2005 Cecala ................ B01F 35/8311 366/132
8,398,294 B2 3/2013 Troxler
8,465,198 B2 6/2013 Hassan et al.
2004/0042335 A1 * 3/2004 Cecala .................. B01F 35/213 366/156.1
2004/0057332 A1 3/2004 Taniguchi
2005/0094486 A1 5/2005 Taniguchi
2006/0120212 A1 * 6/2006 Taniguchi ............. B01F 25/314 366/156.2
2006/0231473 A1 10/2006 Taniguchi
2009/0202702 A1 8/2009 Farber et al.
2021/0113977 A1 4/2021 Shi et al.

* cited by examiner

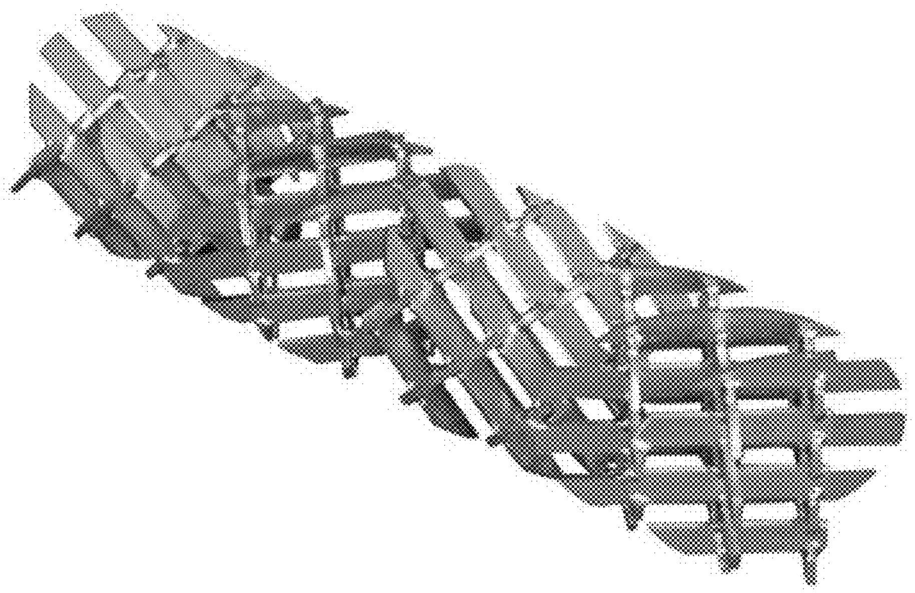
Fig. 4 (Prior art)
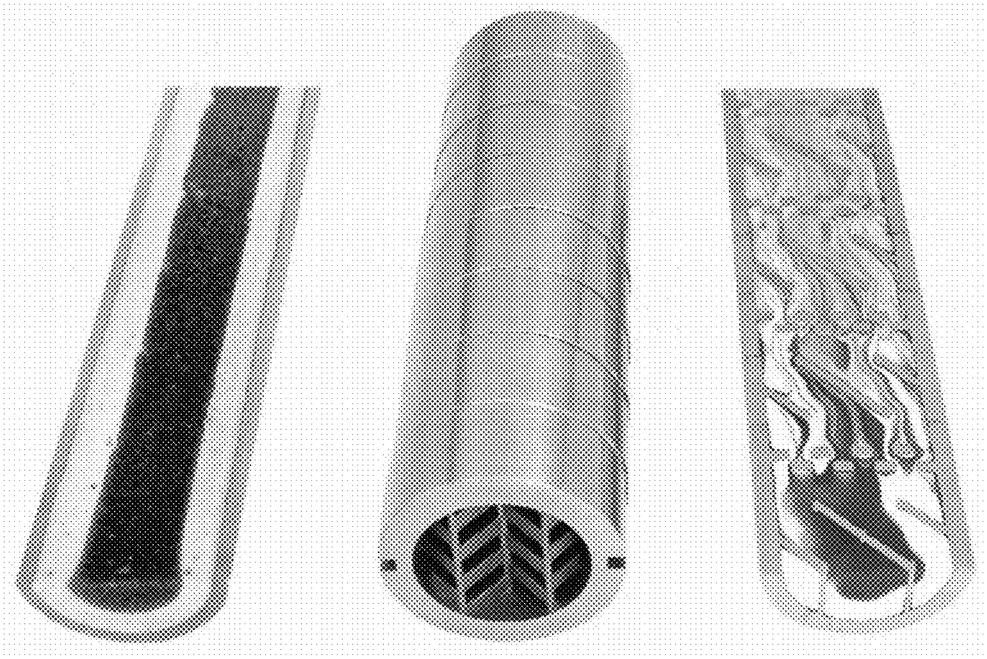
Fig. 5 – (Prior art)

APPARATUS FOR INJECTION OF A POWDER REAGENT INTO THE FLOW OF A PETROLEUM PRODUCT AND PLANT FOR TRANSPORTATION OF PETROLEUM PRODUCTS

FIELD OF THE INVENTION

The invention relates to the field of mixing plants, in particular, to devices for mixing a powder reagent with a flow of a liquid medium.

STATE OF ART

There is a solution (U.S. Pat. No. 8,398,294B2, publ. on 2013 Mar. 19), in which a mixing device is disclosed. The mixing unit comprises the first mixing chamber and the driving means as well as the second mixing chamber and a pump. The hopper holding the powder to be dispersed is connected to a powder inlet. A container, which serves to separate an unmixed substance, is arranged in the recirculation line. A return line, which connects the container to the hopper to feedback the separated substance, can optionally be provided, as indicated by the broken lines. A discharge line, which joins the recirculation line, serves to discharge the dispersion produced from liquid and substance. These lines are provided with valves to control the operation of the apparatus.

But the means preventing liquid from getting in the powder inlet duct are not disclosed in this solution, the proposed design features of the mixing chamber are not disclosed as well.

There is a solution (U.S. Pat. No. 8,465,198B2, publ. on 2013 Jun. 18), in which an inhibitor injection system was disclosed. The basic components of the system include high shear mixing device (HSD) 40 and pump 5, and flow line 10. The high shear device 40 is located external to flow line 10. Line 21 is connected to pump 5 for introducing carrier fluid into HSD 40. Line 13 connects pump 5 to HSD 40, and line 18 may connect HSD 40 to flow line 10. Line 22 may be connected to line 13 for introducing inhibitor into HSD 40. Alternatively, line 22 may be connected directly to an inlet of HSD 40. Additional components or process steps may be incorporated between flow line 10 and HSD 40, or ahead of pump 5 or HSD 40. Line 20 may be connected to flow line 10 at a location 14 upstream of the position where inhibition is required, for example, upstream of a location at which conditions for scale formation or corrosion are predicted. In embodiments, line 21 and line 20 are a single line connecting flow line 10 and pump 5.

But the means preventing liquid from getting in the powder inlet duct are not disclosed in this solution, the proposed design features of the mixing chamber are not disclosed as well.

The mixing device, selected as a prototype (US20040057332A1, publ. on 2006 Aug. 15), comprises a casing having a flow channel through which passes a fluid, an agitation body consisting of a shaft installed in the casing and connected to a motor, and an agitation blade mounted on the perimeter of the shaft; an inlet for feeding a powder into the casing; a liquid inlet in the vicinity of the powder inlet to feed a liquid into the casing; a powder inlet duct connected to the powder inlet, and a powder introducer placed in the powder inlet duct and connected to the motor.

But a mixing chamber of a different design is used in this solution, which is due to little pressure of liquid getting in the mixing chamber, the means preventing liquid from getting in the powder inlet duct are not disclosed.

SUMMARY

In one aspect, an apparatus for injection of a powder reagent into a flow of a petroleum product is disclosed, which comprises:

- a cylindrical mixing chamber comprising at least one inlet for feeding the petroleum product, an inlet for feeding the powder reagent, an outlet to remove the powder reagent mixed with the petroleum product;
- a powder reagent introducer with an outlet connected to the inlet of the mixing chamber through a flow restriction device;
- a pump for feeding the mixture from the mixing chamber to an oil pipeline, in which
- the specified at least one inlet for feeding petroleum products is tangential, an inlet for feeding the reagent and the outlet to remove the mixture are axial;
- the powder reagent introducer is a screw for transporting, which transports the powder reagent to the mixing chamber through the flow restriction device;
- the powder reagent introducer comprises a gear motor rotatably connected to a screw axis with the powder reagent introducer being connected to the flow restriction device using a system of coupling rods, in which case the gear motor can be moved at the screw axis from the first position to the second one when a preset level of a screw load is reached, in which case the moving causes the flow restriction device to open;

the gear motor can be moved from the second position to the first one when the gear motor is switched off, in which case the moving to the first position causes the flow restriction device to close.

In another aspect, a plant for transportation of petroleum products is disclosed, comprising:

- the above apparatus for injection of the powder reagent into the oil pipeline;
- a control unit to operate the above apparatus according to a set scheme of injection of the drag reducing powder reagent.

In additional aspects, it is disclosed that the flow restriction device is a ball valve or a plug valve; the pump is a piston pump or a gear pump; the apparatus further comprising an additional dissolution unit attached between the mixing chamber and the pump; the additional dissolution unit is a static mixer, mill, or a combination thereof.

The main problems solved by the claimed invention are effective injection of the powder reagent into the flow of petroleum products subject to securing the reliability of the apparatus for injection of a powder reagent.

Essentially, the petroleum product flows from the pipeline under pressure into the mixing chamber to wash out the drag reducing powder reagent and mix it to form a slurry. Then, the slurry under the pressure of the flow of petroleum products goes to the piston pump, which homogenizes and pumps the mixture into the oil pipeline. In which case the gear motor rotating the screw is rotatably connected to the screw axis, when the shear to rotate the screw exceeds a preset value, this rotation causes the powder inlet to open, so that the powder gets into the mixing chamber and the petroleum product does not get into the screw. When the additive injection should be completed, the gear motor is switched off, gravity causes it to move back to its original position while closing the powder inlet duct, which prevents the petroleum product from getting in the powder inlet duct and plugging it.

The technical result of the solution involves improving the reliability of the apparatus for injection of a powder reagent.

BRIEF DESCRIPTION OF THE DRAWINGS

FIG. 4 (Prior Art) shows an embodiment 1 of the static mixer.

FIG. 5 (Prior Art) shows an embodiment 2 of the static mixer.

INVENTION EMBODIMENT

There are various solutions for the injection of the powder into a liquid medium, but not all of them are suitable for the injection of the drag reducing powder reagent into a liquid medium flow under high pressure. The high pressure of the petroleum product can cause some petroleum product to get in the powder inlet duct resulting in the plugging of it.

In case of introducing the drag reducing powder reagent into a pipeline, there is a problem of the agglomeration of reagent particles at the outlet of the screw, which results in impaired efficiency of using the reagent. In particular, the drag reducing agents are removed from the screw in the form of large jelly-like pieces to be broken into smaller pieces. Insufficient dissolution of powder particles in petroleum products can result in the breakdown of the pump pumping the mixture into the oil pipeline.

Figure 1:
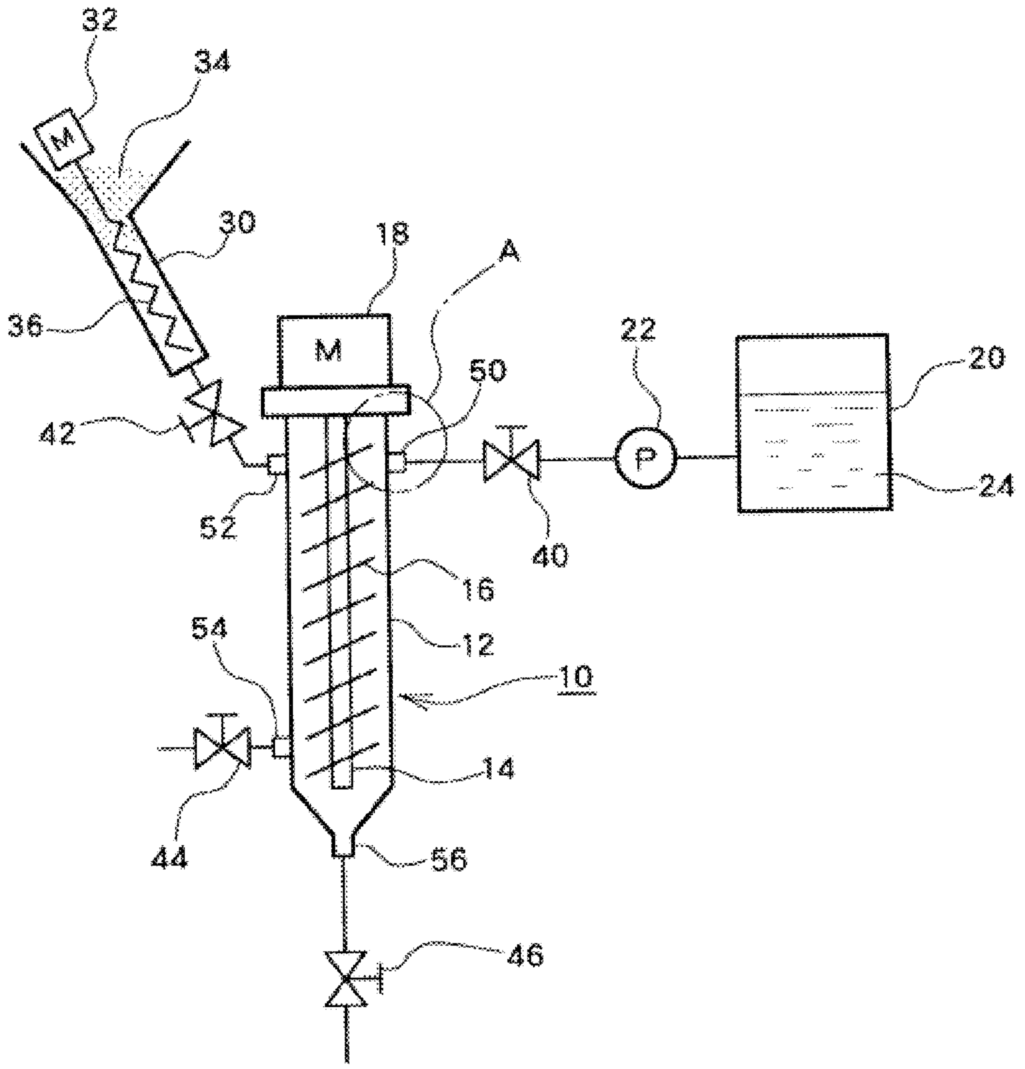
Fig. 1 (Prior art)
FIG. 1 (Prior Art) shows a schematic of the prototype.

The solution selected as a prototype is shown in FIG. 1. Its basic difference is that the liquid is fed into mixing chamber 12 under low pressure and rotating screw 16 driven by motor 18 is used to improve mixing, there is also no pump at the outlet as there is no need to inject the mixture into the pressurized pipeline.

The claimed apparatus for injection of the powder reagent into the flow of a petroleum product comprises a cylindrical mixing chamber, into which the petroleum product flows under pressure, since the petroleum product comes from the pipeline, the pressure is provided by the petroleum product and no additional pump for pumping of the fluid medium is required. Besides, this pressure can be used for the effective mixing of the powder and the fluid medium.

The powder herein means any free-flowing substance, which can be taken and carried over by the screw.

A powder reagent, in particular a drag reducing agent and fluid medium, that is a petroleum product, are simultaneously fed into the mixing chamber. A screw is used for feeding, which transports the powder from the reagent hopper into the mixing chamber. The screw is located in the tube, at the outlet of which a flow restriction device such as a valve, back valve, or another proper device is located.

The petroleum product flows to the mixing chamber to get to the powder agglomerates removed from the screw through the flow restriction device, through this process, the reagent is washed out and dissolved in the mixing chamber to form a slurry.

If the degree of dissolution in the mixing chamber is insufficient due to low temperature of the fluid medium, low solubility, or other reasons, the slurry is moved under flow pressure to the additional dissolution unit (static mixer, mill) or in sequential order: first to one additional dissolution unit and then to the second one. If the degree of dissolution is sufficient, the mixture goes to the pump for injection into the oil pipeline.

In a static mixer, regular change of the flow causes more careful mixing of the slurry, homogenization, and additional dissolution of the solid particles of the reagent in the petroleum product. The reagent particles are ground and dissolved in the mill. The direction of the flow from the mixing chamber can be controlled by opening and closing appropriate valves that control the direction of the flow from the mixing chamber either to the pump or to the additional dissolution unit.

Since the passing of the mixing chamber and electively the other units results in a pressure drop, so to inject the mixture into the oil pipeline a gear pump or piston pump is used. It is preferable to use the piston pump, which is less sensitive to particles, which are not dissolved completely.

DETAILED DESCRIPTION OF THE PREFERRED EMBODIMENTS

Embodiment 1

Figure 2:
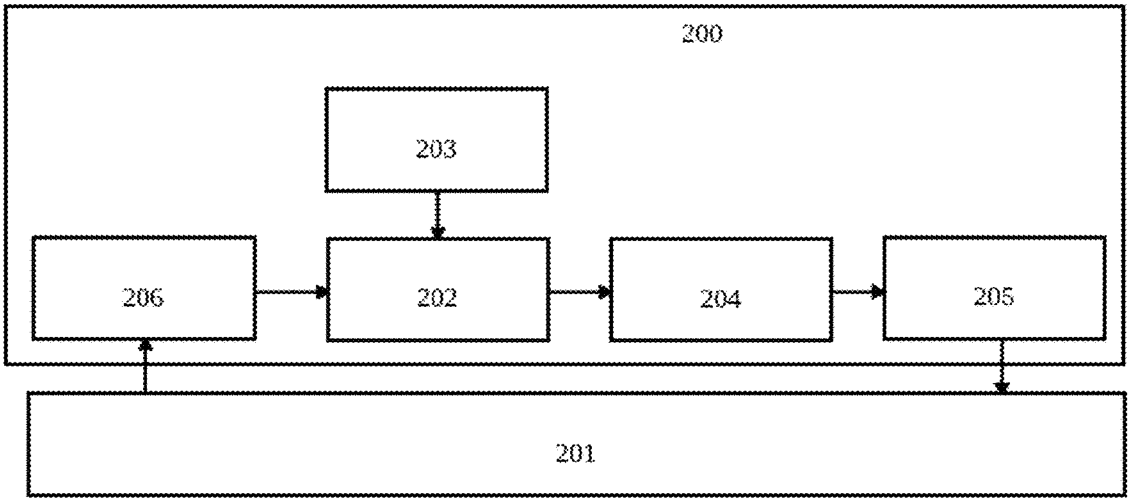
FIG. 2 shows a block diagram of the apparatus for injection of a powder reagent.

In the first embodiment, the claimed solution (FIG. 2) is apparatus 200 for injection of the reagent with an inlet and outlet connected to oil pipeline 201. Apparatus 200 for injection of the reagent comprises mixing chamber 202, powder introducer 203, additional dissolution (electively) unit 204, pump 205. To feed the flow of the petroleum product into apparatus 200 for injection of the reagent, introducer 206 can be used, which is an operated valve.

Mixing chamber 202 is a cylindrical chamber comprising tangential inlets for feeding the petroleum product, an axial inlet at the front edge for feeding the powder reagent, and an axial outlet at another front edge to remove the powder reagent mixed with the petroleum product. However, the inlets for feeding a petroleum product are located to the effect that the petroleum product flows to the inlet for feeding the powder reagent of mixing chamber 202.

The tangential inlets are located in a way that the petroleum products flow under pressure to the powder (which turns into a paste or gel due to a certain pressure exerted by the screw and a certain composition) coining out from the front edge of the cylinder. The tangential location of the ducts results in a swirling flow, which, subject to the pressure in the oil pipeline, actively affects the fed reagent, dissolving it in the circulation process in chamber 202. The location of the inlet for feeding the powder reagent may be either in the center of the cylinder's front edge or at its periphery. The tangential inlets should be located near the axial inlet for feeding the powder, for example at a distance of up to 5 cm from the front edge of chamber 202 nearest to the screw, preferably at a distance of up to 2.5 cm, even more preferably up to 1 cm from the specified front edge.

It is undesirable in the claimed apparatus, if the petroleum product gets in the powder inlet duct, as this may result in the forming of a large piece of the reagent which is forced out by the screw and which plugs the outlet of mixing chamber 202 or prevents unit 204 or pump 205 from operating.

The proposed design ensures efficient washing out, grinding, and mixing of the powder fed by powder introducer 203 since the petroleum products flow in a direction perpendicular to the direction of the powder feeding. The flow fed under pressure moves through cylindrical chamber 202 at high speed, constantly changes its direction, which results in washing out and dissolution of the powder. However, no mechanical means are required, as the design features of the claimed apparatus ensure this effect.

The number of tangential inlets is selected based on the requirement for high-quality mixing of the petroleum product and powder and restrictions related to the complexity of implementation of a large amount of the inlets. It is proposed in the solution to use from one to four tangential inlets. Since a larger amount complicates the implementation but does not have a significant effect on the operation of the claimed apparatus. The diameter of the tangential inlets can vary from 0.25 cm to 2.5 cm. The diameter of the inlets is selected subject to the options of the screw, the characteristics of the powder, and the amount of powder introduced per unit volume of the petroleum product, etc.

The tangential inlets are connected to the oil pipeline through introducer 206, which contains at least one of the following components: an operated valve, bypass lines, a hydraulic lock, a flow meter.

The tangential inlets are located in mixing chamber 202 so that the oil petroleum flows to the powder feed zone to wash it out effectively. The flow of petroleum products takes the powder, dissolves it partially, and moves to the outlet located at the second front edge of mixing chamber 202 cylinder.

Powder introducer 203 is a powder container connected to the screw for transporting powder to chamber 202. At the inlet, through which the powder is fed to mixing chamber 202, there is a flow restriction device (not shown in FIG. 2), for example, a ball back valve, ball valve, or a plug valve. This device is used to prevent the entry of petroleum products into the powder reagent inlet duct.

The screw for transporting the powder comprises a gear motor-driven screw. The gear motor is selected subject to the diameter of the screw, the axial loads during the operation. The screws with a diameter of 25 mm to 50 mm and reduction gears with a reduction factor of 25-40 are used practically. According to the known geometry of the screw, the feeding volume of the reagent powder depends on the rotational frequency of the screw and is adjusted by a frequency converter. The performance can be adjusted also by selecting reduction gears with different gear ratios.

The powder container can be equipped with a stirrer to secure the operation reliability of device 203 since, without the stirrer, the agglomerations formed in the powder mass can prevent the powder particles from entering the screw.

The ball back valve used in some embodiments is not externally controlled, it opens under the pressure of the powder flow fed by introducer 203 and closes when introducer 203 stops the powder flow and the remaining powder is washed out by the oil flow so that the back valve spring can move the ball back to its original position and close the duct.

The plug valve used in some embodiments is operated by an external drive, it opens at the beginning of feeding the powder and closes at the end, the advantage of the plug valve is the reliable separation of the powder from the petroleum product since when the reagent has been washed out, there is no need to wait until the back valve is closed. The advantage of the ball back valve is more reliable operation because no external power source is required to drive it.

In the embodiment with a ball valve, the gear motor rotating the screw is rotatably connected to the screw axis. As a result, at the beginning of the operation of the gear motor, until the screw is filled with the powder and does not create a great counterforce for the gear motor, only the screw rotates. When the screw is full and the powder transported by it stops in front of the closed ball valve, the increasing counter-force of the screw results in the fact that the gear motor starts to turn at the axis of the screw. The claimed apparatus has a bearing to rotate the gear motor. To prevent uncontrolled rotation of the gear motor, a rotation limiter is provided.

The limiter can be a stopper that prevents the gear motor from turning through an angle preceding the preset one. When the gear motor strikes against the stopper, its rotation force is transferred to the screw, but since flow restriction device 305 is open, no overloading occurs and the powder enters mixing chamber 202.

Figure 3:
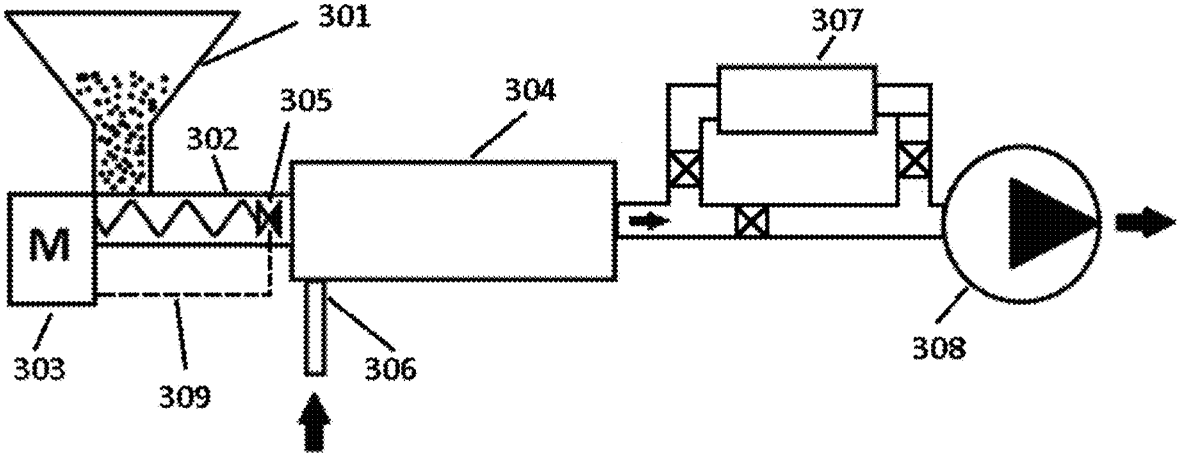
FIG. 3 shows the approximate view of the apparatus for injection of a powder reagent.

An approximate view of the proposed apparatus is shown in FIG. 3, which schematically shows hopper 301 with a solid reagent (in the form of a powder with the particles of any size, but the size is limited by the ability of screw feeder 302 to transport the powder with such parameters). Screw feeder 302 is a rod with a helical surface, which has a cylindrical body and is driven by gear motor 303. The operation of screw feeder 302 can be synchronized with the operation of the stirrer located in hopper 301 (not shown). A stirrer is required if there are cavities in the powder that prevent it from falling into the bottom of the hopper.

Screw feeder 302 transports the powder from hopper 301 to mixing chamber 304. Besides, flow restriction device 305 is installed at the outlet of the screw feeder 302, which prevents the spontaneous pull-out of the powder and the penetration of oil into the cylindrical body of screw feeder 302. Mixing chamber 304 is a cylinder, from one front edge of which powder is introduced, and from the other front edge, a mixture of powder and oil is discharged.

The petroleum product is fed to chamber 304 through at least one tangential channel 306. Channel 306 is formed so that the petroleum product flowing under high pressure washes out the powder (sticky powder, pasty mass). The preferred embodiment is that with the tangential direction of the channel(s) to form the movement of the fluid facilitating active washing out of the powder at the location of flow restriction device 305 (one of the options is a ball back valve). Flow restriction device 305 is preferably centered in the chamber 304 cylinder, the number of tangential channels 306 is preferably 3 or 4 to provide better washing out (and pre-dissolution) of the powder. If channels 306 are not located near the front edge with flow restriction device 305, so the powder will be poorly washed out and the quantity of the washed-out pre-dissolved powder at outlet 304 will be controlled in a bad way.

Another problem with poor powder washout is that if a back valve is used, it will not be able to close as the powder mass will prevent it from doing so. The valve is opened by the operation of screw feeder 302, which transports the powder into chamber 304, but it is closed not only when the operation of screw feeder 302 stops, but also when the extruded mass of the powder is washed out.

In chamber 304, the powder is mixed with oil fed from tangential channel 306 connected to the oil pipeline. Due to the pressure of the flow from channel 306, this mixture either flows directly to pump 308 or through additional dissolution unit 307, in which the mixture is homogenized additionally due to multiple changes in the direction of flow and separation of it into many parts (static mixer) or due to grinding of powder particles (mill). The mixture flows from the outlet of mixing chamber 304 using valves.

A static mixer is a cylinder with attached flow guides. The static mixer embodiments used are shown in FIG. 4-FIG. 7.

The static mixer in FIG. 4 is a 3D mesh, the passage of a liquid with the powder through the mesh results in significant turbulence and a high degree of mixing and dissolution of the powder.

FIG. 5 shows the mixing procedure in the static mixer shown in FIG. 4 As shown by FIG. 5, a constant change of the flow leads to the fact that the dark and light fluids fed to the inlet (bottom) are mixed homogeneously at the outlet (top). The powder and the liquid are mixed in the same way.

Figure 6:
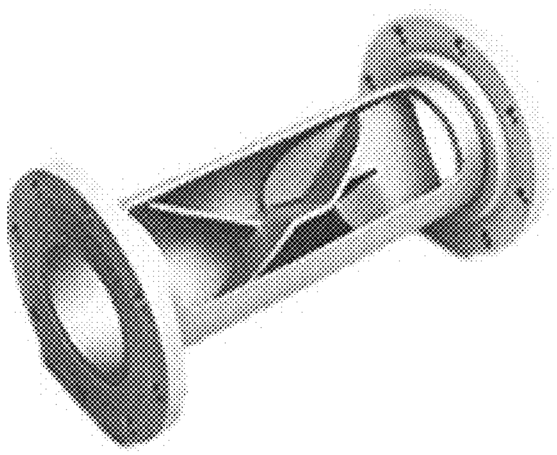
Fig. 6 (Prior art)
FIG. 6 (Prior Art) shows an embodiment 3 of the static mixer.

In the static mixer of FIG. 6, the flow guides are plates that break and mix the flow.

Figure 7:
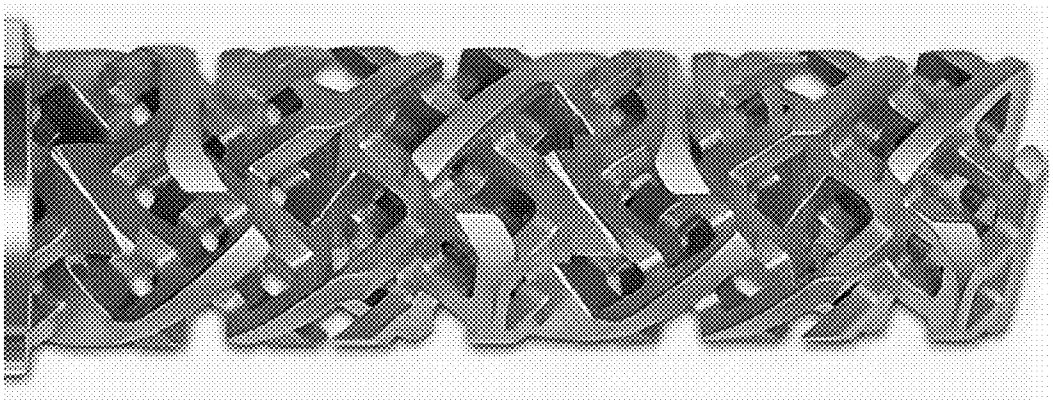
Fig. 7 (Prior art)
FIG. 7 (Prior Art) shows an embodiment 4 of the static mixer.

The static mixer of FIG. 7 is a 3D mesh, the passage of a liquid with the powder through the mesh results in significant turbulence and a high degree of mixing and dissolution of the powder.

Preferably, the cross-section of the static mixer corresponds to the amount of the cross-sections of the tangential inlets in mixing chamber 304 to save sufficient flow energy for the homogenization of the oil and powder reagent.

Preferably, the operation of flow restriction device 305 in the form of a ball valve is performed using gear motor 303. In this embodiment, gear motor 303 is rotatably connected to the axis of the powder transportation screw. In which case, when gear motor 303 rotates at the screw axis, the ball valve is mechanically affected through connecting link 309, and it turns (opens or closes).

When the power supply is disconnected, the gear motor is at its lowest point, approximately at the same level as the screw (see details below). After the power is supplied and the screw begins to transport the powder, the counterforce of the screw emerges and begins to grow, and when the transported powder stops in front of the closed ball valve, the growing of the counterforce results in the fact that gear motor 303 begins to rotate around the axis of the screw and goes up.

This motion of the gear motor through link 309, consisting, for example, of a system of coupling rods, is transmitted to the ball valve and causes it to open. Since the counterforce decreases when the valve is opened, at the end of its initial upward motion, gear motor 303 should be in the position in which it will not move back to its original position by gravity, which will cause the valve to close, the closing of the valve, in turn, will cause repeated rotation of gear motor 303 around the screw axis, etc. All this will result in an uncontrolled interrupted supply of the reagent and wear of the components of the claimed apparatus. However, the position of gear motor 303 after its initial rotation shall provide that after turning off the power, it can return to its original position by gravity.

The inventors believe that it will not be difficult for a person skilled in the art to select the correct range of angles of rotation of gear motor 303 around the axis of the screw to ensure compliance with the above conditions. Specific values depend on the weight of the gear motor 303, the distance from its center of gravity to the screw axis, the resistance force emerging in the process of transportation of the reagent (which depends on the diameter, shape, and material of the screw).

Figure 8:
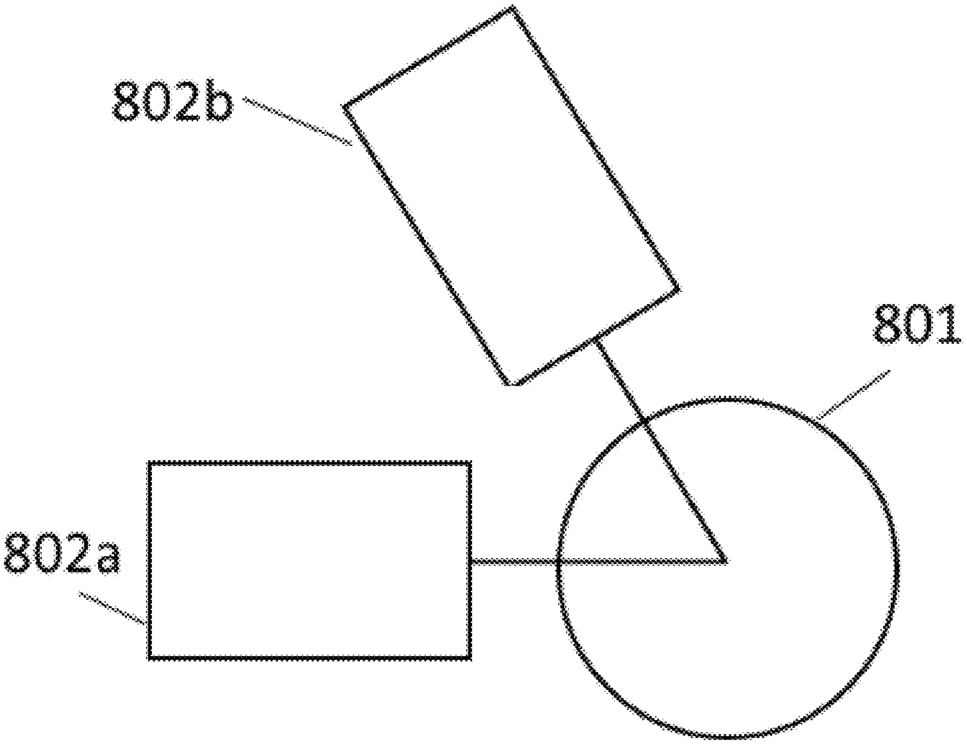
FIG. 8 shows an alternate positions of the gear motor.

FIG. 8 shows the approximate view of an embodiment with screw 801 and gear motor 802. In which case, the gear motor is designated 802*a* in the original position, and it is designated 802*b* in the position after the ball valve is opened (end position).

Preferably, gear motor 802*a* is located in the original position at an angle of 0 to +30 degrees to the horizon, even more preferably from 0 to +20 degrees to the horizon, even more preferably from 0 to +10 degrees to the horizon. In this range of angles, the greatest torque is required to rotate the gear motor around the screw axis, since the projection of the center of gravity on the horizontal axis is as far as possible from the screw axis.

In which case, gear motor 802*b* should be in the end position at an angle from 45 to 85 degrees to the horizon, preferably from 60 to 80, even more preferably from 70 to 80 degrees to the horizon. Less torque is required at these angles to keep gear motor 802 in this position. However, an angle of 90 degrees cannot be used, as in this case, there is a risk that, after the power is turned off, gear motor 802 will not go down by gravity and will not close the ball valve, which will result in getting of the petroleum product in the screw and even in the hopper.

Link 309 is not described in detail herein, since its embodiment is not a creative task. The moving of gear motor 802 from position 802*a* to position 802*b* should cause the ball valve to turn and open, the moving of the gear motor back to its original position should cause the ball valve to close, this is a basic requirement for link 309. Link 309 can be embodied, for example, using coupling rods.

The reliability of the apparatus is improved and the need for separate control of flow restriction device 305 is removed in the above embodiment.

The Operation of the Claimed Apparatus

The operation of the apparatus for injection of a reagent begins with the turning on of the inlet valve to feed petroleum products to mixing chamber 202, the petroleum products flow to chamber 202.

Powder reagent introducer 203 is turned on and using the screw, the powder under the pressure (about 1000 kg/cm2) enters the inlet of mixing chamber 202, the ball of the ball valve under the pressure gets out the valve seat and the powder passes into mixing chamber 202 or gear motor goes up under the pressure, what causes the ball valve to open and the powder gets in chamber 202. If the flow restriction device is operated, so it is driven by control signals from the control unit.

The flow of petroleum products starts to wash out the powder reagent fed to chamber 202, which can be paste-like due to high compression in the screw.

The amount of powder reagent fed is set by controlling the rotation speed of the screw.

Due to the pressure of the flow of petroleum products, the mixture of petroleum products and powder reagent goes either to pump 205 inlet or additional dissolution unit 204 inlet and then to pump 205 inlet, which pumps the prepared mixture to the pipeline. A substantially homogenized mixture in which the reagent is at least partially dissolved is fed from pump 205 to the pipeline.

Then, the petroleum product with the added drag reducing agent flows through the pipeline with less hydrodynamic drag.

When the feeding of the powder reagent is stopped, the reagent already injected into chamber 202 is washed out by the flow of petroleum products, due to which the back valve (the embodiment with a back valve) is turned off and no excess reagent is introduced. While the feeding is performed, the uniform feeding of the reagent to the pipeline is performed.

The apparatus for injection of a reagent can be operated manually or automatically.

In case of the automated operation of the injection, a controller (microcontroller, control unit, dedicated terminal) is installed, which operates the valve for feeding the petroleum product into the mixing chamber, the screw, and the pump and reads out data of at least the flow sensors of the petroleum and powder. The communication between these components of the apparatus for injection of a reagent is wired in a preferred embodiment. The controller can obtain data from the flow meter that measures the volume of the petroleum fed to the chamber, data from the strain gauges that measure the flow rate of the powder reagent, data from the pressure sensor at the outlet of the static mixer, analyze them and control the reagent feeding.

In the preferred embodiment, the controller is made with an option to stop the screw to wash the reagent out from mixing chamber 202, and stop the flow of the petroleum product into chamber 202 and stop the pump after some time which is set ahead. Due to this solution, the reagent is completely washed out from chamber 202, which prevents its solidification, and makes it possible to turn off the back valve through which the reagent is fed since if the powder is not washed out, the back valve cannot be turned off even after the screw stops.

The proposed apparatus can be a component of the plant for transportation of petroleum products, which comprises the proposed apparatus for injection of a reagent into the flow of a petroleum product and a unit to control this apparatus, which can operate the components of the apparatus for injection of a reagent to feed automatically the set amount of the powder reagent to the oil pipeline.

Embodiment 2

In a second embodiment, a method of transporting the petroleum product is disclosed in which the powder reagent and the flow of petroleum products are introduced into mixing chamber 202, then this mixture flows through unit 204 and is pumped back into the oil pipeline by pump 205.

To control the amount of oil fed into chamber 202, a flow meter is used on the line connecting the oil pipeline and chamber 202. To control the amount of the powder fed, strain gauges are used, which are preferably installed under the frame with the components of the claimed apparatus. There is also an embodiment with measurement of the powder weight, strain-gage sensors can be used, which measure the weight of the hopper with the powder.

The amount of the reagent introduced into the flow of the petroleum products is fixed according to the parameters of the reagent, petroleum product, oil pipeline, environment. In case of the use of drag reducing agents, this amount is fixed in virtue of ensuring the maximal drag reduction and/or the minimal consumption of the reagent, it must be considered that the reagent can impair the quality of the final product prepared from the pumped petroleum product.

To automate the process of injection of the reagent, a control unit is used, which receives signals from the flow meter, devices to measure the flow of the powder (for example, strain gauges), compares these data with pre-entered required parameters, and adjusts the operation of powder introducer 203. The control unit can control the rotation speed of the electric motor driving the screw and by doing so control the amount of powder introduced into mixing chamber 202.

The control unit can be implemented based on controllers, processors, dedicated circuits, and the necessary peripherals. The control unit can be implemented based on PC with the integrated dedicated software and sensor signal input boxes and boxes for the output of control signals to the components of the apparatus for injection of a reagent.

Both manual and automatic operation of the apparatus for injection of a powder reagent is possible. In case of the automatic operation, if the apparatus for injection of a reagent is switched on, the control unit turns on the valve for feeding the petroleum product from the oil pipeline, turns on the electric motor to drive the screw, and feed the powder reagent, and turns on the pump for the injection of the petroleum product mixed with the reagent into the oil pipeline.

When the apparatus for injection of a reagent is switched off, the apparatus is flushed with the petroleum product during a preset time, for example, 5 minutes. This is achieved using the control unit that first stops the screw and then after a preset time stops the pump. Due to this, the residual dry matter is washed out from chamber 202. When the feeding of the dry matter is switched off, the ball valve is turned off and the agent residues are removed from chamber 202.

It has to be considered that the dry drag reducing reagent if combined with any petroleum product, forms a mixture that thickens upon contact with air, which after a certain time (1-2 hours) will be difficult to remove from the pipeline and other components of the apparatus. In a few days, the mixture (upon contact with air) turns into a rubbery mass, which will be very difficult to remove.

Embodiment 3

In some embodiments, powder introducer 203 is filled not with powder but with crumbs up to 5 cm. Such crumbs require additional efforts for their complete dissolution in the petroleum product, therefore, an additional dissolution unit 204 is attached to the claimed apparatus.

Unit 204 is a static mixer, mill, or a combination thereof. The mill is a conical, vibro-cavitation colloid, rotary-hammer colloid, rotary-pulsation colloid mill, roller, or disk mill. Any disc mills can be used: single-disc; double-disc; multiple-disc; back-to-back disc mills, which does not affect the essence of the solution.

The mill is equipped with a separator that lets only particles of an acceptable size pass the outlet. Larger particles are sent to the inlet for re-grinding. The mill is set up to the effect that the temperature appropriate for a polymer additive is maintained.

Based on the data on the properties of the reagent and the requirements for the slurry at the outlet of the proposed apparatus for injection of a reagent, the reagent feed rate of the screw, the switching on or off of additional dissolution unit 204, and, if necessary, other parameters are selected.

Embodiment 4

In this embodiment, a plant for transportation of petroleum products is disclosed, which comprises the claimed apparatus for injection of a powder reagent into a pipeline, in which case the plant comprises a control unit, actuators, and sensors for the automatic injection of the amount of the powder reagent set according to the dosing scheme into the pipeline. The dosing scheme can be changed based on the readings of temperature sensors, oil product composition sensors, data on the injected reagent, etc. The control unit processes all input data and adjusts the operation of the apparatus for injection to ensure the appropriate reduction of hydrodynamic drag.

The embodiments are not limited to the embodiments described herein, other embodiments of the invention staying within the essence and scope of the present invention will be apparent for a person skilled in the sphere of technologies based on the information set forth and the knowledge of the state of art.

The components in the singular do not exclude the plurality of the components unless otherwise specified.

The functional connection of the components should be understood as a connection that ensures the correct interaction of these components with each other and the implementation of one or another functionality of the components. Particular examples of functional communication can be communication with the ability to exchange information, communication with the ability to transfer electric current, communication with the ability to transmit mechanical motion, communication with the ability to transmit light, sound, electromagnetic or mechanical vibrations, etc. The specific type of functional relationship is determined by the nature of the interaction of these components, and, unless indicated otherwise, is provided by well-known means using principles widely known in the art.

The methods disclosed herein comprise one or more steps or stages to implement the described solution. The steps and/or stages of the method can be substituted for each other staying within the claims of the invention. In other words, if a specific order of steps or stages is not established, the order and/or use of specific steps and/or stages may vary staying within the claims of the invention.

Although exemplary embodiments have been described in detail and shown in the accompanying drawings, it should be understood that such embodiments are illustrative only and are not used to limit the broader invention and that the invention should not be limited to the specific configurations and structures shown and described, as other various modifications may be apparent to the persons skilled in the relevant field.

The features mentioned in various dependent claims, as well as the implementations disclosed in various parts of the description, can be combined to achieve the advantageous effect, even if the possibility of such a combination is not disclosed explicitly.

What is claimed is:

1. An apparatus for injection of a powder reagent into a flow of a petroleum product to produce a mixture, comprising:

a cylindrical mixing chamber comprising at least one inlet for feeding the petroleum product, an inlet for feeding the powder reagent, an outlet to remove the powder reagent mixed with the petroleum product;

a powder reagent introducer with an outlet connected to the inlet of the mixing chamber through a flow restriction device;

a pump for feeding a mixture from the mixing chamber to an oil pipeline, in which the at least one inlet for feeding petroleum products to the cylindrical mixing chamber is tangential, the inlet for feeding the reagent to the cylindrical mixing chamber and the outlet to remove the mixture from the cylindrical mixing chamber are both axial;

the powder reagent introducer is a screw for transporting, which transports the powder reagent to the mixing chamber through the flow restriction device;

the powder reagent introducer comprises a gear motor rotatably connected about an axis of the screw with the powder reagent introducer being connected to the flow restriction device using a system of coupling rods, in which case the gear motor can be rotatably moved about the axis from a first position to a second position when a preset level of a load of the screw is reached, in which case the rotational movement of the gear motor causes the flow restriction device to open;

the gear motor can be rotataby moved from the second position to the first position when the gear motor is switched off, in which case the gear motor rotatably moves to the first position and causes the flow restriction device to close.

2. The apparatus of claim 1, in which the flow restriction device is a ball valve or plug valve.

3. The apparatus of claim 1, in which the pump is a piston pump or a gear pump.

4. The apparatus of claim 1, further comprising an additional dissolution unit attached between the mixing chamber and the pump.

5. The apparatus of claim 4, wherein the additional dissolution unit is a static mixer, mill, or a combination thereof.

6. A plant for transportation of petroleum products, comprising:

the apparatus of claim 1 for injection of the powder reagent into the oil pipeline;

a control unit to operate the apparatus according to a set scheme of injection of the powder reagent.

* * * * *